US012090959B2

(12) United States Patent
Salter et al.

(10) Patent No.: US 12,090,959 B2
(45) Date of Patent: Sep. 17, 2024

(54) TECHNIQUES FOR ADJUSTING VEHICLE RUNNING BOARD POSITION

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Brendan Diamond, Grosse Pointe, MI (US); John Robert Van Wiemeersch, Novi, MI (US); Lawrence Amadi, Chicago, IL (US); Manda Mustaine, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 17/671,989

(22) Filed: Feb. 15, 2022

(65) Prior Publication Data
US 2023/0256909 A1 Aug. 17, 2023

(51) Int. Cl.
*B60R 3/02* (2006.01)
*B60R 16/037* (2006.01)

(52) U.S. Cl.
CPC .............. *B60R 3/02* (2013.01); *B60R 16/037* (2013.01)

(58) Field of Classification Search
CPC ................................ B60R 3/02; B60R 16/037
USPC ........................................................ 280/166
See application file for complete search history.

(56) References Cited

U.S. PATENT DOCUMENTS

| 7,318,596 | B2 | | 1/2008 | Scheuring, III et al. | |
|---|---|---|---|---|---|
| 9,205,781 | B1 | * | 12/2015 | May | B60R 3/02 |
| 9,333,919 | B2 | * | 5/2016 | Crandall | B60R 3/002 |
| 9,994,168 | B1 | * | 6/2018 | Jensen | B60R 3/002 |
| 10,077,002 | B2 | * | 9/2018 | Okuyama | B60R 3/002 |
| 10,081,302 | B1 | * | 9/2018 | Frederick | B60R 3/002 |
| 10,336,260 | B1 | * | 7/2019 | Salter | B60R 3/02 |
| 10,377,300 | B1 | * | 8/2019 | Salter | B60R 3/002 |
| 10,576,879 | B1 | * | 3/2020 | Salter | B60Q 1/325 |
| 10,654,418 | B2 | * | 5/2020 | He | B60R 3/002 |
| 10,695,238 | B2 | * | 6/2020 | Thompson | A61G 3/068 |
| 11,208,044 | B2 | * | 12/2021 | Smith | B60R 3/02 |
| 2010/0194070 | A1 | | 8/2010 | Stauffer et al. | |

(Continued)

FOREIGN PATENT DOCUMENTS

| CN | 110217176 A | 9/2019 |
|---|---|---|
| CN | 110303988 A | 10/2019 |
| JP | 2020152289 A | 9/2020 |

*Primary Examiner* — Hau V Phan
(74) *Attorney, Agent, or Firm* — Vichit Chea; Carlson, Gaskey & Olds, P.C.

(57) ABSTRACT

A motor vehicle according to an exemplary aspect of the present disclosure includes, among other things, a running board assembly including a deck, and a linkage assembly configured to guide movement of the deck. The vehicle further includes a motor configured to move the linkage assembly to adjust a position of the deck, and a sensor configured to obtain information indicative of activity adjacent an exterior of the motor vehicle. Additionally, the vehicle includes a controller configured to interpret the information from the sensor to determine a length of at least a portion of a leg of a person. The controller is configured to instruct the motor to adjust the position of the deck based on the determined length.

13 Claims, 7 Drawing Sheets

(56) References Cited

U.S. PATENT DOCUMENTS

| | | | |
|---|---|---|---|
| 2015/0123374 A1* | 5/2015 | Smith | B60R 3/002 |
| | | | 280/166 |
| 2018/0297530 A1* | 10/2018 | Stickles | B60R 3/02 |
| 2019/0071021 A1* | 3/2019 | Pribisic | B60R 3/02 |
| 2019/0315278 A1* | 10/2019 | Watson | B60R 3/002 |
| 2020/0062183 A1* | 2/2020 | Smith | G05D 3/10 |
| 2020/0114937 A1* | 4/2020 | Mair | H02K 41/031 |
| 2020/0156547 A1* | 5/2020 | Watson | B60R 3/02 |
| 2020/0339039 A1 | 10/2020 | Watson | |

* cited by examiner

TECHNIQUES FOR ADJUSTING VEHICLE RUNNING BOARD POSITION

TECHNICAL FIELD

This disclosure relates to motor vehicles having a running board, and in particular relates to techniques for adjusting the position of the running board.

BACKGROUND

Sport utility vehicles (SUVs), trucks, pickup trucks, vans, and other vehicles, such as four-wheel drive (4WD) vehicles, have a relatively high ground clearance, meaning the vehicle floor is at a relatively high elevation above the ground.

Running boards are known, and have been used to aid with entering and exiting vehicles with a high ground clearance. Some retractable running board assemblies (sometimes referred to as power running board assemblies, electric running board assemblies, or adjustable running board assemblies) include a running board that is moveably connected to the vehicle by one or more linkages. The linkages are driven by an actuator, which typically includes a motor. Together, the linkages and actuator are configured to move the running board between a retracted position (sometimes referred to as a "stowed" position) and one or more deployed positions.

SUMMARY

A motor vehicle according to an exemplary aspect of the present disclosure includes, among other things, a running board assembly including a deck, and a linkage assembly configured to guide movement of the deck. The vehicle further includes a motor configured to move the linkage assembly to adjust a position of the deck, and a sensor configured to obtain information indicative of activity adjacent an exterior of the motor vehicle. Additionally, the vehicle includes a controller configured to interpret the information from the sensor to determine a length of at least a portion of a leg of a person. The controller is configured to instruct the motor to adjust the position of the deck based on the determined length.

In some aspects, the techniques described herein relate to a motor vehicle, wherein: the controller is configured to interpret the information from the sensor to determine a gait of the person, and the controller is configured to adjust the position of the deck based on the determined length only when the controller determines that the gait of the person is normal.

In some aspects, the techniques described herein relate to a motor vehicle, wherein: the controller is configured to interpret the information from the sensor to determine that the person has an abnormal gait, and if the controller identifies that the person has an abnormal gait, the controller is configured to instruct the motor to adjust the position of the deck based on one or more of a body length of the person, an arm length of the person, and grab handle height.

In some aspects, the techniques described herein relate to a motor vehicle, wherein: the controller is configured to interpret the information from the sensor to determine a speed of the person, and the controller is configured to instruct the motor such that the position of the deck is adjusted before the person is in a position to enter the motor vehicle.

In some aspects, the techniques described herein relate to a motor vehicle, wherein: in response to instructions from the controller, the motor is configured to adjust a position of the deck between a stowed position and one of a plurality of predefined deployed positions, and in each of the predefined deployed positions, the deck is at a different height from a ground surface relative to each of the other deployed positions.

In some aspects, the techniques described herein relate to a motor vehicle, wherein the controller is configured to issue an instruction to the motor to move the deck to a particular one of the plurality of deployed positions based on the information from the determined length.

In some aspects, the techniques described herein relate to a motor vehicle, wherein the controller is configured to instruct the motor to adjust a height position of the deck relative to a ground surface, a lateral position of the deck relative to a body of the motor vehicle, and an angular position of the deck based on the information from the sensor.

In some aspects, the techniques described herein relate to a motor vehicle, wherein: the position of the deck is adjusted based on one or more factors in addition to the determined length based on a mode selected by a user of the motor vehicle, in a first mode, the additional factors include curb height and floor height, and in a second mode, the additional factors include curb height, floor height, and seat height.

In some aspects, the techniques described herein relate to a motor vehicle, wherein, in addition to the determined length, the controller is configured to instruct the motor to adjust the position of the deck based on one or more of a curb height, a floor height, and a seat height.

In some aspects, the techniques described herein relate to a motor vehicle, wherein: the controller is configured to use the information from the sensor to recognize the person as an authorized user, and if the authorized user has a predefined deck position setting, the controller is configured to instruct the motor to set the position of the deck to the predefined deck position setting.

In some aspects, the techniques described herein relate to a motor vehicle, wherein: the controller is configured to interpret the information from the sensor as a plurality of people adjacent the motor vehicle, the controller is configured to determine an ideal position of the deck for each of the plurality of people based at least on a leg length of each of the plurality of people, and the controller is configured to rank the plurality of people and to instruct the motor to position the deck to the ideal position corresponding to the higher-ranked of the plurality of people.

In some aspects, the techniques described herein relate to a motor vehicle, wherein the controller is configured to interpret the information from the sensor to determine the length of one or both of a femur or a tibia of the person.

In some aspects, the techniques described herein relate to a motor vehicle, wherein: the controller is configured to remember the position, the controller is configured to instruct the motor to move the deck from the position to a stowed position to after the person enters the motor vehicle, and in anticipation of the person exiting the motor vehicle, the controller is configured to instruct the motor to move the deck from the stowed position back to the position.

A method according to an exemplary aspect of the present disclosure includes, among other things, identifying a person approaching a motor vehicle, determining a length of at least a portion of a leg of the person, and adjusting a position of a deck of a running board assembly of the motor vehicle based on the determined length.

In some aspects, the techniques described herein relate to a method, further including: identifying a plurality of people in a group with the person, wherein each of the plurality of people in the group is approaching the motor vehicle; determining a speed and a trajectory of each of the plurality of people in the group; identifying a door that each of the plurality of people in the group is likely to enter based on the determined speed and trajectory; determining a leg length of each of the plurality of people in the group; and adjusting a deck of a running board assembly associated with each door of the motor vehicle based on the determined leg lengths of the plurality of people identified as likely to enter the corresponding door.

In some aspects, the techniques described herein relate to a method, wherein the position of the deck is adjusted based on one or more additional factors in addition to the determined length based on a mode selected by a user of the motor vehicle.

In some aspects, the techniques described herein relate to a method, wherein: in a first one of the modes, the additional factors include curb height and floor height, and in a second one of the modes, the additional factors include curb height, floor height, and seat height.

In some aspects, the techniques described herein relate to a method, further including: identifying the person as an authorized user, wherein the determining and adjusting steps are only performed if the person is identified as an authorized user.

In some aspects, the techniques described herein relate to a method, wherein: the running board assembly includes a linkage assembly configured to guide movement of the deck and a motor configured to move the linkage assembly to adjust a position of the deck, the determined length is determined by a controller using information from one or more sensors, and the position of the deck is adjusted by the motor in response to instructions from the controller.

Another method according to an exemplary aspect of the present disclosure includes, among other things, identifying a pet approaching a motor vehicle or a person with an abnormal gait approaching the motor vehicle. If a pet is identified, the method includes determining a proportion of a body of the pet, and adjusting a position of a deck of a running board assembly based on the determined proportion. If a person with an abnormal gait is identified, the method includes determining a length of a body of the person or a length of an arm of the person, and adjusting a position of the deck based on the determined length and further based on a height of a grab handle of the motor vehicle.

DETAILED DESCRIPTION

This disclosure relates to motor vehicles having a running board, and in particular relates to techniques for adjusting the position of the running board. Among other benefits, this disclosure accommodates users of various body proportions, abilities, and also accommodates pets. One particular benefit is that the present disclosure is able to set the position of a deck of the running board based on the length of the leg of the potential user, which results in the deck being in a convenient location for the potential user. Another benefit of the present disclosure is that it can take advantage of existing hardware, and thus can be implemented effectively.

Figure 1:
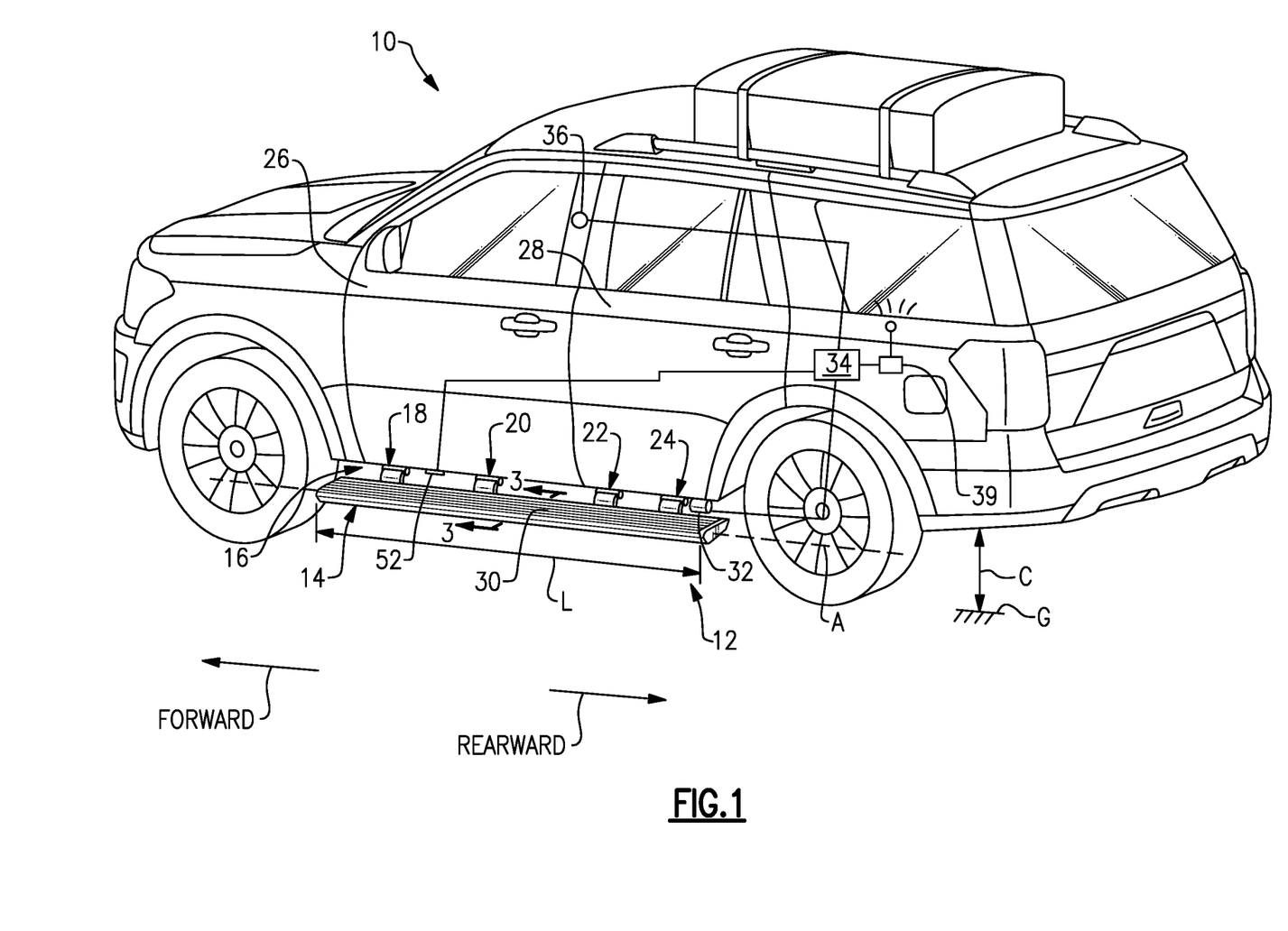
FIG. 1 is a perspective view of a motor vehicle with an example running board assembly.

Referring to the drawings, FIG. 1 is a rear-perspective view of a motor vehicle 10 ("vehicle 10"). The vehicle 10 has a relatively high clearance C, which is representative of a distance between a ground surface G and a floor of the vehicle 10. As shown, the vehicle 10 is a sport utility vehicle (SUV). While an SUV is pictured, this disclosure is also applicable to other types of vehicles having a high ground clearance, such as vans, trucks, and buses.

The vehicle 10 includes a retractable running board assembly 12 moveable from a retracted, or stowed, position to a plurality of deployed positions. The retractable running board assembly 12 may be referred to as an adjustable running board assembly, a powered running board assembly, an electric running board assembly, a moveable running board assembly, or simply a running board assembly.

The deployed positions may be referred to as use positions in which the running board assembly 12 is useable by a user, namely a person or pet, such that a user may step on a deck of a running board 14. The running board assembly 12 is shown in a deployed position in FIG. 1. In this example, the running board assembly 12 includes the running board 14 and linkage assembly 16 configured to guide movement of the running board 14 between the stowed and deployed positions.

The linkage assembly 16 includes four sub-assemblies 18, 20, 22, 24 in this example. The sub-assemblies 18, 20, 22, 24 are spaced-apart from one another along a length L of the running board 14. The sub-assemblies 18, 20, 22, 24 may each be referred to as a linkage assembly. While four sub-assemblies 18, 20, 22, 24 are shown, the linkage assembly 16 may include one or more sub-assemblies. The linkage assembly 16 is shown schematically in FIG. 1. This disclosure is not limited to a particular type of linkage assembly, nor is this disclosure limited to a linkage assembly with a particular number of sub-assemblies. Below, this disclosure describes various movements of the running board 14, and the linkage assembly 16 is able to accomplish these movements, including moving the running board to different heights, lateral positions (i.e., the lateral distance X, labeled in FIG. 3, to and from the body of the vehicle 10), and different pitches (i.e., by tilting the running board about its longitudinal axis A).

The running board 14 has a length L that extends in a direction parallel to the "forward" and "rearward" directions, which are labeled in FIG. 1 and correspond to the normal "forward" and "rearward" orientations of the vehicle 10. The longitudinal axis A is parallel to the length L and runs through the running board 14, as shown in FIGS. 1 and 3. The running board 14 in this example spans at least a majority of the widths of a front door 26 and a rear door 28 of the vehicle 10. While only one running board 14 is shown in FIG. 1, it should be understood that a similar running board 14' (see FIGS. 2 and 7) may be provided on an opposite side of the vehicle 10. In an example, the running board 14' is a mirror image of the running board 14 about the centerline of the vehicle 10, and is controlled in the same manner as the running board 14. Further, while one running board 14 extends below both the front door 26 and the rear door 28, in another example there are two running boards, moveable independent of one another, that replace the running board 14. In that example, the two running boards could be set to different deployed positions under the front and rear doors 26, 28, depending on which user approaches which door.

When in one of the deployed positions, a user may step on the running board 14 as they enter or exit the vehicle 10. Specifically, the user may step on a deck 30 (or, step pad or stepping platform) of the running board 14, which in this example provides the uppermost surface of the running board 14.

In this example, a motor 32 is mounted adjacent the sub-assembly 24. The motor 32 is configured to adjust a position of the running board 14 between the retracted and deployed positions. In one example, the motor 32 is in communication with a controller 34, which instructs the motor 32 to move the running board 14 between the retracted and deployed positions based on a number of factors. In this disclosure, one of the primary factors is a length of the leg of the potential user of the vehicle 10, as will be discussed below. Other factors include the gait of the potential user of the vehicle 10. The controller 34 may also consider whether the doors 26, 28 are opened or closed, and may also consider whether a user provides a cargo access command.

The controller 34 is shown schematically in FIG. 1. It should be understood that the controller 34 could be part of an overall vehicle control module, such as a vehicle system controller (VSC), or could alternatively be a stand-alone controller separate from the VSC. Further, the controller 34 may be programmed with executable instructions for interfacing with and operating the various components of the vehicle 10. The controller 34 may be operable in response to signals from a key fob, a vehicle infotainment system, or a mobile device of a user, for example. The controller 34 additionally includes a processing unit and non-transitory memory for executing the various control strategies and modes of the vehicle system.

In one example, the motor 32 is an electric motor, and is responsive to instructions from the controller 34 to selectively adjust a position of the linkage assembly 16, and in turn the running board 14 and the deck 30. While one motor 32 is shown, additional motors could be provided, with each motor configured to cause different movements of the deck 30.

The vehicle 10, in this example, includes a plurality of sensors which provide information useable by the controller 34 in adjusting a position of the running board 14. In an example, the vehicle 10 includes an image sensor 36, which may be a camera, mounted such that the image sensor 36 is able to capture still images or video of a potential user adjacent a side of the vehicle 10. The controller 34 may use this information to determine body proportion of the potential user. The controller 34 may then move the running board 14 to a particular deployed position corresponding to determined body proportion.

Figure 2:
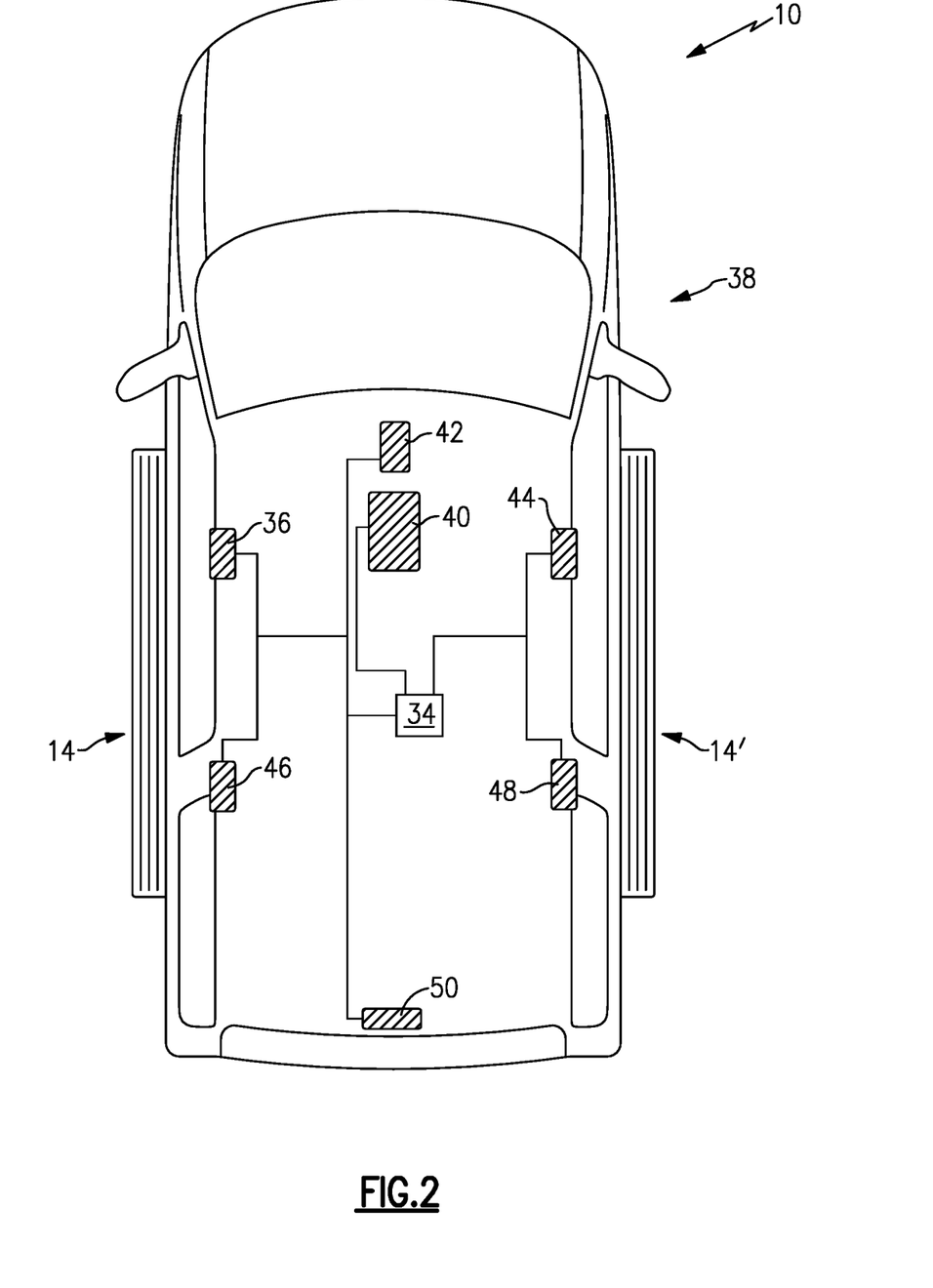
FIG. 2 is a top view of the motor vehicle and schematically illustrates a plurality of sensors.
Figure 3:
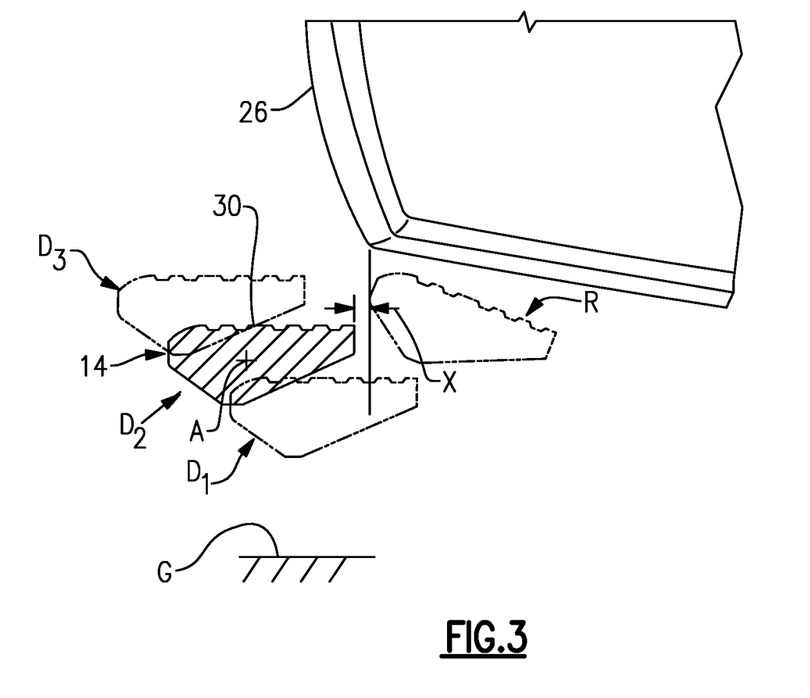
FIG. 3 is a cross-sectional view taken along line 3-3 and illustrates the running board in four example positions.

FIG. 2 illustrates an example arrangement of sensors on the vehicle 10, which is referred to as a sensor system 38, which here is an exterior sensor system configured to obtain information indicative of activity occurring adjacent the vehicle 10. Specifically, the sensor system 38 is configured for detecting various conditions corresponding to the external surroundings of the vehicle 10, and the sensor system 38 is able to generate signals indicative of those conditions and to send those signals to the controller 34, for example.

In the example of FIG. 2, a sensor 40 on top of the vehicle 10 is a light detection and ranging (LIDAR) sensor. The exterior sensor system 38 also includes a forward-facing sensor 42, a plurality of side sensors 36, 44, 46, 48, and a rear-facing sensor 50. The sensors 36, 42, 44, 46, 48, 50 may be provided by one or more of image sensors, such as cameras, radio detecting and imaging (RADAR) sensors, LIDAR sensors, ultrasonic sensors, and wireless sensors systems utilizing Bluetooth® low energy (BLE) or Ultra Wide-Band (UWB) technology, as examples. One or more of the sensors of the exterior sensor system 38 may be part of a blind spot information system (BUIS) or another type of advanced driver-assistance system (ADAS). The locations of the sensors 36, 40, 42, 44, 46, 48, 50 are exemplary only. It should be understood that this disclosure extends to vehicles that have different exterior sensor systems. The sensor system 38 may include additional or fewer sensors. In one particular example, the sensor 40 is not included.

Referring back to FIG. 1, in addition to the sensors shown in FIG. 2, the sensor system 38 also includes an image sensor 52 mounted to a body of the vehicle 10 and configured to generate still images or video useable by the controller 34 to determine a position of the deck 30 of the running board 14 relative to the ground surface G and/or relative to a body of the vehicle 10. The image sensor 52 is also able to provide information about the ground surface G and, if the vehicle 10 is near a curb, to provide information usable to determine curb height. The sensor 52 could also detect the curb using UWB technology.

The vehicle 10 also includes a transceiver 39 configured to receive signals from a key fob, a keypad on the door 26 (for example), a mobile device of a user (i.e., using the phone as a key, sometimes abbreviated PaaK), or a button within the vehicle 10. The transceiver 39, in particular, may receive a cargo access command. In response to a cargo access command, the controller 34 instructs the motor 32 to move the running board 14 to the highest deployed position such that a user is better able to access a top of the vehicle, which may contain cargo such as luggage, canoes, bicycles, skis, etc.

FIG. 3 is a somewhat schematic cross-sectional view of the running board 14 taken along line 3-3 and illustrates four example positions of the running board 14 relative to the door 26. As represented in FIG. 3, the running board 14 is moveable between a retracted position R (shown in phantom) and three deployed positions $D_1$-$D_3$. In the retracted position R, the deck 30 is beneath the body of the vehicle 10 and does not project significantly, if at all, laterally outward beyond the body of the vehicle 10. In the retracted position R, the running board 14 is essentially tucked under a lower surface of the door 26 to protect the running board 14 while the vehicle 10 is in motion, for example.

A first deployed position $D_1$ is a low height position in which the deck 30 of the running board 14 is closest to the ground surface G. A second deployed position $D_2$ is a mid-height position. A third deployed position $D_3$ is a maximum height position in which the deck 30 is at its highest height relative to the ground surface G. In FIG. 3, the running board 14 is in the second deployed position $D_2$ in which the deck 30 is arranged at a height above the ground surface G between the heights associated with the first and third deployed positions $D_1$, $D_3$.

When the vehicle 10 is stationary, the motor 32 is configured to drive the running board 14 under instructions from the controller 34 to one of the deployed positions $D_1$-$D_3$. In each of the deployed positions $D_1$-$D_3$, the deck 30 of the running board 14 is substantially parallel to a ground surface G. Thus, the running board 14 may support a user in each of the deployed positions $D_1$-$D_3$. In the second deployed position $D_2$, the running board 14 is displaced further laterally (i.e., to the left-hand side, relative to FIG. 3, as indicated by lateral distance X) from a body of a vehicle 10 relative to the first deployed position $D_1$. Further, in the third deployed position $D_3$, the running board 14 is displaced further laterally from the body of the vehicle than in second deployed position $D_2$. The third deployed position $D_3$ facilitates cargo access.

While a four-position (i.e., retracted/stowed, first deployed, second deployed, and third deployed positions) running board assembly is shown in the figures, it should be understood that this disclosure extends to running board assemblies that are moveable to another number of positions. In a particular example, the running board assembly may be moveable to such a large quantity of positions that it may be considered infinitely adjustable.

In this disclosure, the running board assembly 12 is configured to hold the running board 14 in a particular deployed position by actively monitoring the position of the running board 14, using sensor 52, and applying torque to the motor 32 as necessary to maintain the position. If a user is standing on the running board 14 for a period of time such that a thermal breaker of the motor 32 is about to trip, an alert, such as an audible and/or visual alert, may be presented to the user asking the user to step off the running board 14. In this regard, the vehicle 10 may include a speaker or sound exciter configured to issue the alert. When holding one of the stowed or deployed positions, a torque limit of the motor 32 may be overridden for a period of time. Optionally, the motor 32 may include a brake configured to selectively lock the motor 32, and in turn the running board 14, in a desired one of the stowed or deployed positions. Another approach to preventing motor over stress may be to slowly lower the running board 14 to position $D_1$ which would place the least torque on the motor or linkages.

Figure 4:
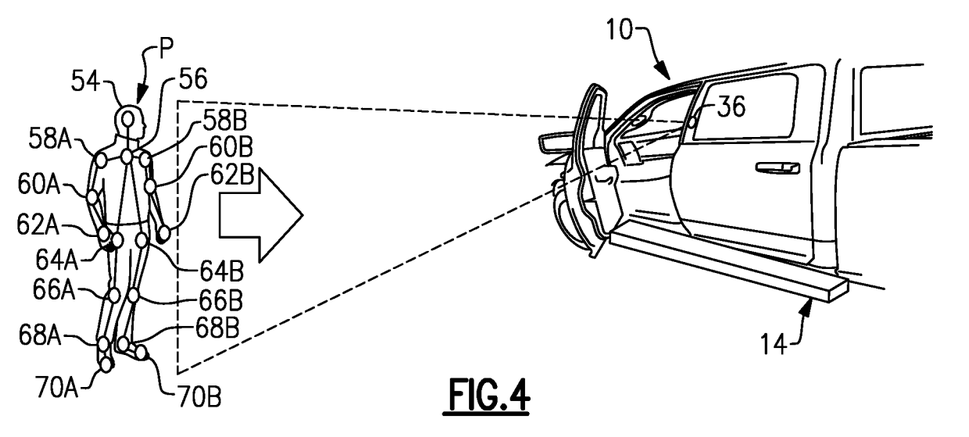
FIG. 4 is a rear-perspective view representative of a person approaching the motor vehicle.

In an example of this disclosure, the vehicle 10 is configured to adjust the height of the deck 30 of the running board 14 based on a length of a leg of a person P (FIG. 4). In FIG. 4, a person P is approaching the vehicle 10. The controller 34 is able to determine that the person P is approaching the vehicle 10 by using information from the sensor system 38. The person P is initially considered a potential user by the controller 34 and, if identified using one or more pieces of information, is considered an authorized user of the vehicle 10. Only one sensor 36 is shown in FIG. 4, but it should be understood that the controller 34 may be interpreting signals from multiple sensors to track and monitor the movement of the person P.

In an example, the controller 34 only monitors the person P if the person P is identified as an authorized user. The controller 34 may determine that the person P is an authorized user based on a signal from the transceiver 39, which may have detected a mobile device of a user (PaaK), or by using facial recognition, as examples.

The controller 34, in this example, determines the length of the leg of the person P using one or more techniques for determining the proportions of a body of an individual. Such techniques include programming the controller 34 to use information from the sensor system 38 to perform a human pose estimation (HPE) by detecting the coordinates of a particular number of joints on the person P. The controller 34 also conducts a gait analysis and is programmed to determine whether the gait of the person P is normal or abnormal. In one example, the controller 34 uses the gait analysis to refine and/or verify the HPE of the person P.

In FIG. 4, controller 34 has detected the coordinates of various points on the person P. The points include a head point 54, a chest point 56, shoulder points 58A, 58B, elbow points 60A, 60B, wrist points 62A, 62B, hip points 64A, 64B, knee points 66A, 66B, ankle points 68A, 68B, and toe points 70A, 70B. The points 54-70B are coordinates in three dimensional space, and may be plotted using a Cartesian (i.e., x, y, z) coordinate system.

In this example, the controller 34 determines the length of the leg of the person P by determining the vertical distance between one of the hip points 64A and a corresponding one of the ankle points 70A. The controller 34, in another example, may determine leg length by adding the distance between one of the hip points to the corresponding knee point, with the distance between the knee point to the corresponding ankle point. The controller 34 may perform the same calculation for both sides of the body of the person P and average the results. Additionally, the controller 34 may separately determine femur length and/or tibia length, and use one or both of femur and tibia length to set the height of the deck 30.

Figure 5:
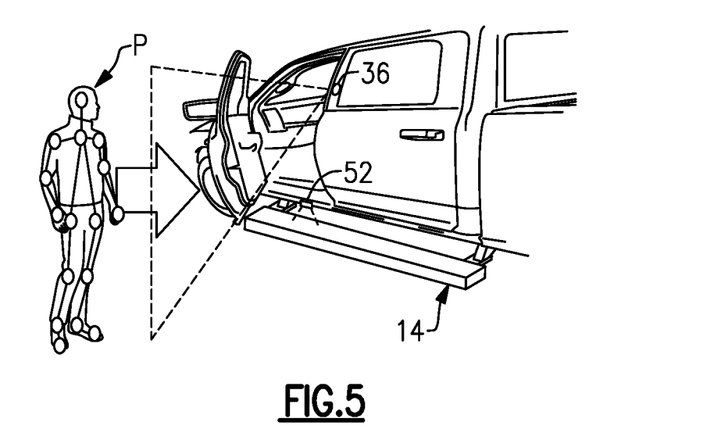
FIG. 5 is another rear-perspective view representative of the person approaching the motor vehicle.

The controller 34 includes or has access to an algorithm and/or a lookup table that correlates an appropriate height of the deck 30 to a length of the leg of the person P. With the length of the leg of the person P determined, the controller 34 uses the algorithm and/or lookup table to determine the appropriate height of the deck 30, and then instructs the motor 32 to move so as to adjust the position of the deck 30, if necessary, to an appropriate one of the deployed positions $D_1$-$D_3$ or another appropriate deployed position, as shown in FIG. 5. In the position of FIG. 5, the person P can conveniently enter the vehicle 10 using the running board 14.

While setting a height of the deck 30 based on a height of the person P may be beneficial, especially compared to static running board assemblies or running board assemblies that deploy to a universal height, this disclosure accounts for the fact that leg length may vary among people with the same height.

In one aspect of the disclosure, the controller 34 uses information from the sensor system 38 to determine a speed at which the person P is walking and predicts a time at which the person P will be in position to enter the vehicle 10. Based on the prediction, the controller 34 is configured to instruct the motor 32 to adjust the position of the deck 30 such that the deck 30 will be in an appropriate deployed position when the person P is in a position to enter the vehicle 10.

While leg length is mentioned above, additional factors may be considered by the controller 34 when adjusting the position of the deck 30. Further, in some circumstances, leg length is not available or not an appropriate indicator of running board height, as will be explained.

In one aspect of this disclosure, the controller 34 is configured to determine whether the gait of the person P is normal or abnormal. In this disclosure, a normal gait refers to a walking pattern of a person that is relatively healthy, not using walking aids, and most likely has a substantially healthy musculoskeletal system. An abnormal gait refers to a walking pattern of a person that does not exhibit such a gait. Known abnormal gaits include antalgic gait, ataxic gait, arthrogenic gait, Trendelenburg's gait, lurching gait, Parkinsonian gait, psoatic limp gait, scissors gait, steppage gait, hemiplegic gait, contracture, among others. Abnormal gaits also refer to people using walking aids such as walkers, canes, or wheelchairs, as examples, to assist with walking or as a replacement for traditional walking. When the person P is using a walking aid such as a walker, cane, or wheelchair, it may not be possible to determine the leg length of the person P. As such, in one aspect of this disclosure, the controller 34 only uses leg length to set the position of the deck 30 when the gait of the person P is a normal gait.

In an aspect of this disclosure, a user of the vehicle 10 can select one of a plurality of factory pre-set modes, each of which corresponds to a different combination of factors that the controller 34 considers when setting the position of the deck 30.

In a first example mode, the position of the deck 30 is adjusted based on a determined leg length of the potential user, curb height, and floor height. Curb height refers to the height of a curb adjacent the running board 14, if present. Floor height refers to the height differential between a floor of the vehicle 10 and the ground surface G. In a second example mode, the position of the deck 30 is adjusted based on a determined leg length of the potential user, curb height, floor height, and seat height. Seat height is the distance between the ground surface G and a seat of the vehicle 10, such as a top of a cushion of a seat. The factors considered in the first and second modes are exemplary. The first and second modes both include leg length as a factor. The controller 34 includes different lookup tables corresponding to the first and second modes, respectively. The first and second modes are used only when the controller 34 determines that the person P has a normal gait, in one example.

Figure 6:
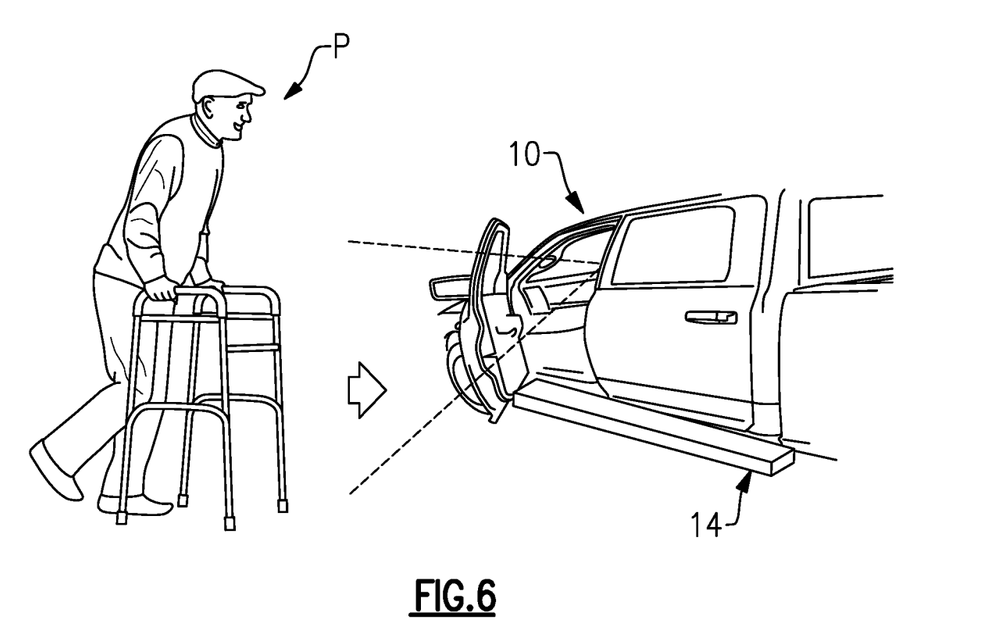
FIG. 6 is a rear-perspective view representative of another person approaching the motor vehicle.

A third exemplary mode corresponds to users that have an abnormal gait. FIG. 6 represents a person P with an abnormal gait relative to the vehicle 10. In the third example mode, the controller 34 adjusts the position of the deck 30 based on a length of a body of the person P, a length of an arm of the person P, and vehicle grab handle position, if present. The grab handle position is a height at which a grab handle is positioned above the ground surface G. Since the person P exhibits an abnormal gait, considering grab handle position, arm length, and body length allows the controller 34 to instruct motor 32 to adjust the deck 30 to a position conducive to the person P being able to reasonably reach the grab handle when entering and exiting the vehicle 10 using the running board 14. The length of the body of the person P may be determined based on the distance between head point 54 (FIG. 4) and one or both of the ankle points 68A, 68B, as examples, or the distance between a head point 54 and the ground surface G. The length of the arm may be based on the distance between a shoulder point 58A and a corresponding wrist point 62A, or based on the sum of the distance between a shoulder point 58A and elbow point 60A added to the distance between the elbow point 60A and the hand point 62A, as examples. The arm length may be determined using points on both sides of the body of the person P and then averaged. While leg length is not needed in the third exemplary mode, if leg length is available (i.e., the sensors' view of the person P is not blocked by a walker), it can be used.

In each of the three modes, the controller 34 is configured to instruct the motor 32 (or another motor associated with the running board 14) to adjust a lateral distance X (FIG. 2) of the deck 30 relative to the body of the vehicle 10 and to rotate the deck 30 about the longitudinal axis A. In some examples, the controller 34 may determine that the deck 30 should be moved laterally or inclined, for example, to promote use of the running board 14. These movements may be based on determinations that the ground surface G is uneven or based on one or more proportions of the body of the person P, including those that have been mentioned above (leg length, body length, arm length) and additional proportions such as foot size, which may be determined based on the distance between an ankle point 68A and a toe point 70A, torso size, hip width, chest width, as examples.

In one aspect of this disclosure, the controller 34 uses information from the sensor system 38 to recognize the person P as an authorized user associated with the vehicle 10, such as an owner of the vehicle 10 or, in rideshare applications, a user matching the profile of the person that booked a particular trip. When the controller 34 identifies an authorized user, the controller 34 determines whether the user has a pre-set, desired height of the deck 30. If so, the controller 34 instructs the motor 32 to set the height of the deck 30 to the authorized user's pre-set desired height.

Another aspect of this disclosure relates to groups of people entering or exiting the vehicle 10 at or around the same time. In this aspect, the controller 34 is configured to interpret information from the sensor system 38 as a group of people intending to enter the vehicle 10 at or around the same time. In one example, the controller 34 does this by identifying at least one authorized user, such as by detecting a mobile device, key fob, or using facial recognition, and next identifying a plurality of people walking toward the vehicle 10 and/or within a certain, predefined distance of the authorized user.

Figure 7:
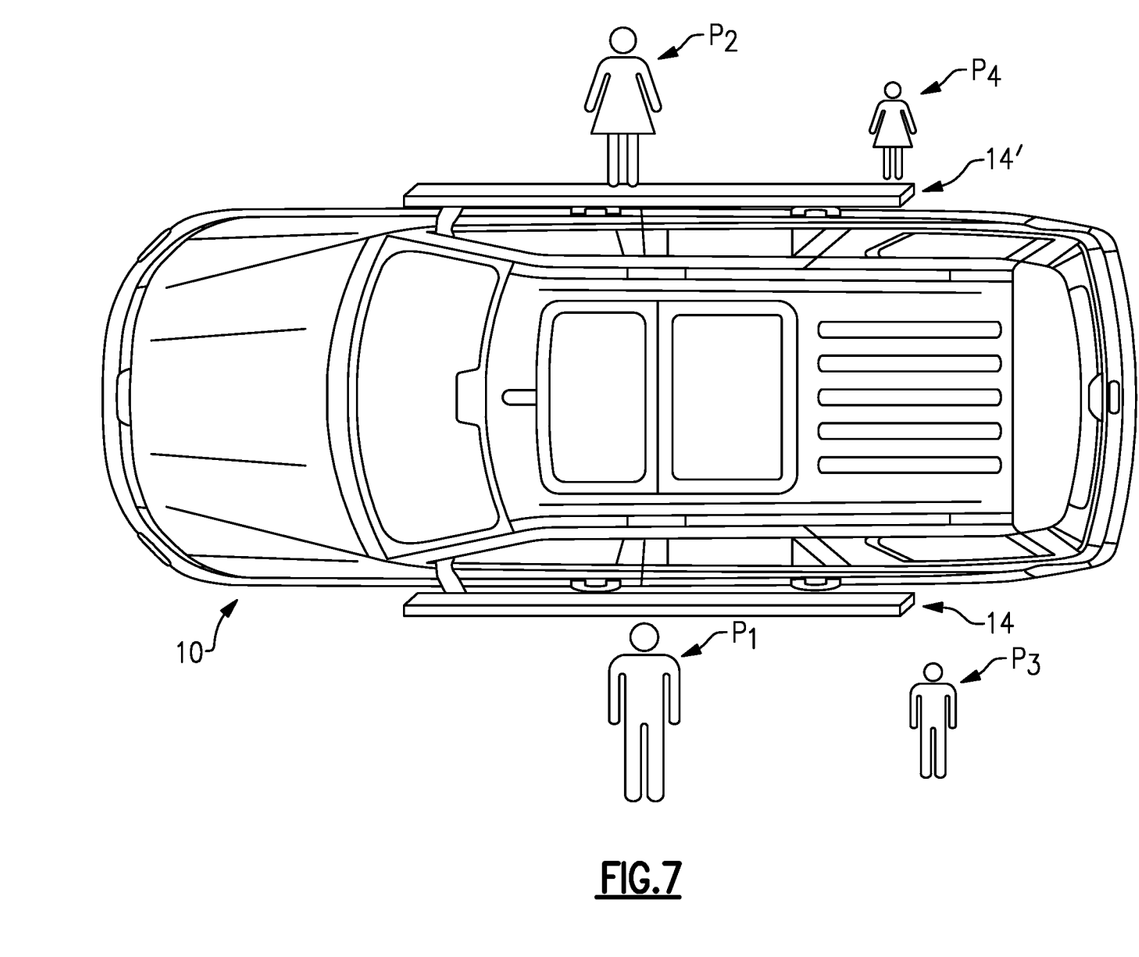
FIG. 7 is a top view of the motor vehicle and is representative of a plurality of people approaching the motor vehicle.

FIG. 7 illustrates a plurality of people $P_1$-$P_4$ approaching the vehicle 10, with people $P_1$ and $P_2$ being adults, and people $P_3$ and $P_4$ being children, with smaller bodies than the adults. In the example of FIG. 7, the person $P_1$ is an authorized user. The controller 34 determines that the person $P_1$ is authorized using facial recognition, in this example. The controller 34 also determines that, by determining their trajectory and speed, the people $P_1$-$P_4$ are approaching the vehicle 10. The controller 34 then considers an appropriate height of the deck 30 for each individual person based on the mode selected by the user, as an example. The controller 34 is also able to determine which door of the vehicle 10, and which of the running boards 14, 14', each of the users is likely to use when entering the vehicle 10. The controller 34 uses a priority ranking system to set the height of the deck 30 based on which of the people $P_1$-$P_4$ are anticipated to use which of the running boards 14, 14' and the corresponding ranking of those people $P_1$-$P_4$. In one example, the decks 30 of the running boards 14, 14' are set to heights to prioritize in rank adults over children. In another example, the decks 30 of the running boards 14, 14' are set to heights to prioritize in rank children over adults. In still a further example, the decks 30 of the running boards 14, 14' are set to heights to prioritize in rank those with abnormal gaits over those with normal gaits, or vice versa.

Figure 8:
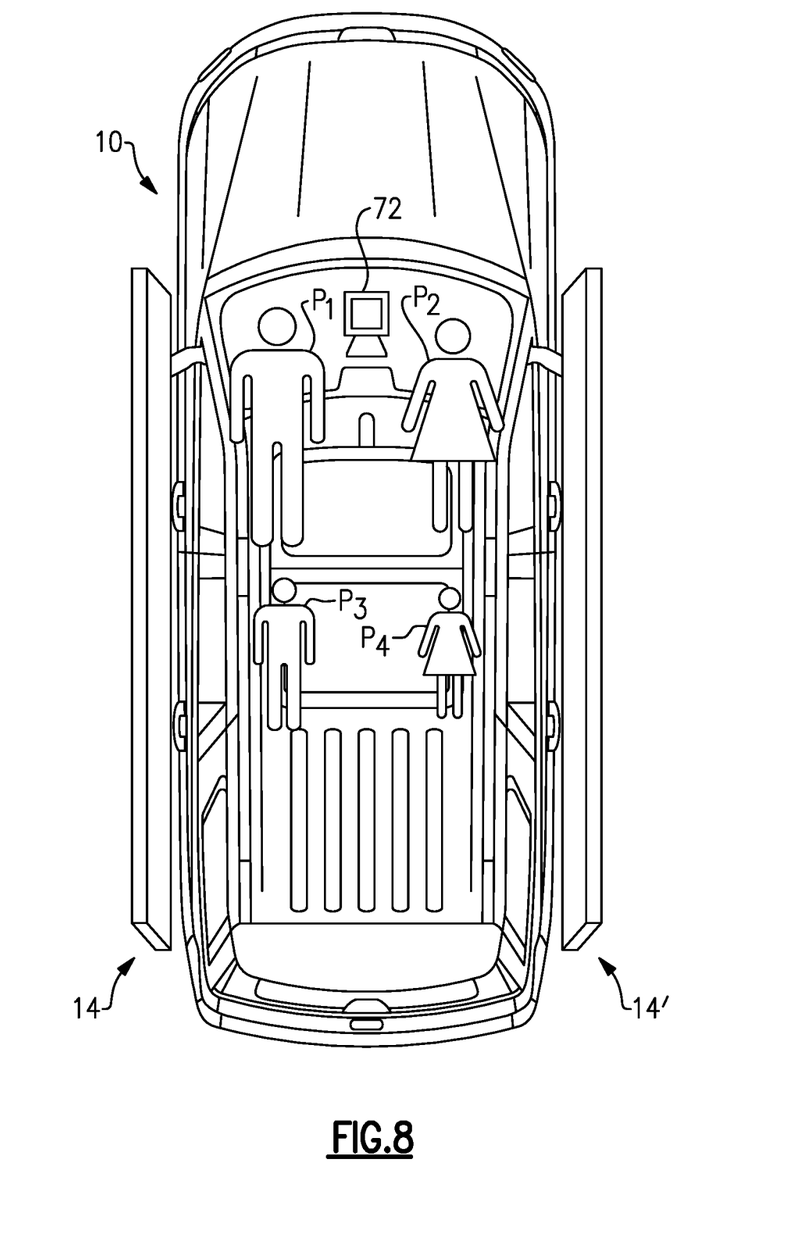
FIG. 8 is a top view of the motor vehicle and is representative of the plurality of people inside the motor vehicle.

When the people $P_1$-$P_4$ enter the vehicle 10, as in FIG. 8, the controller 34 instructs the motor 32 to move the running boards 14, 14' to their respective stowed positions. The controller 34 remembers the height corresponding to each of the people $P_1$-$P_4$ and is configured to re-set the running boards 14, 14' to that height when the controller 34 anticipates that the people $P_1$-$P_4$ are going to exit the vehicle 10, such as after a trip is completed. An aspect of this disclosure includes using a sensor 72, such as a camera, within the vehicle 10 to determine if any of the people $P_1$-$P_4$ switched seats and/or is likely to exit the vehicle 10 from a side other than the side they entered the vehicle 10.

In another aspect of the disclosure, if the controller 34 cannot obtain any information about the person P and/or people $P_1$-$P_4$, as may be the case in low visibility or low light conditions, the controller 34 will default to the last-used height of the deck 30.

Figure 9:
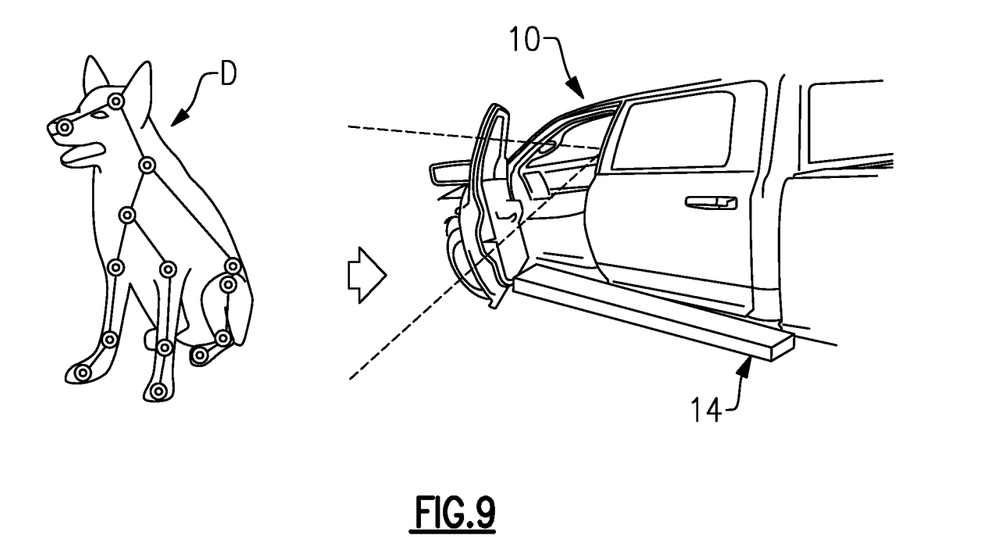
FIG. 9 is a rear-perspective view representative of a pet approaching the motor vehicle.

Still another aspect of this disclosure relates to identification of pets, such as dogs D, as shown in FIG. 9. The controller 34 is configured to use the information from the sensor to identify a pet. If a pet is identified, the controller 34 is configured to instruct the motor to move the deck to a position conducive to permitting the pet to enter the vehicle 10. In particular, the controller 34 can perform a pet pose estimation and identify various joints of the pet, as generally shown in FIG. 9, and can set the deck 30 to a position conducive to permitting the pet to enter the vehicle 10 using the running board 14. The controller 34 is able use information from the sensor system 38 to determine one or more proportions of the pet, including proportions of limbs of the pet and/or overall proportions of the pet, and uses a pet-specific lookup table to determine a height of the deck 30 conducive to that particular pet. If a pet is identified, the pet may have a higher priority-ranking than any people that are identified such that the running board 14 accommodates the pet, or vice versa.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a running board assembly comprising a deck, a linkage assembly configured to guide movement of the deck, and a motor configured to move the linkage assembly to adjust a position of the deck;
a sensor configured to obtain information indicative of activity adjacent an exterior of the motor vehicle; and
a controller configured to interpret the information from the sensor to determine a length of at least a portion of a leg of a person, and wherein the controller is configured to instruct the motor to adjust the position of the deck based on the determined length.

2. The motor vehicle as recited in claim 1, wherein:
the controller is configured to interpret the information from the sensor to determine a gait of the person, and the controller is configured to adjust the position of the deck based on the determined length only when the controller determines that the gait of the person is normal.

3. The motor vehicle as recited in claim 2, wherein:
the controller is configured to interpret the information from the sensor to determine that the person has an abnormal gait, and
if the controller identifies that the person has an abnormal gait, the controller is configured to instruct the motor to adjust the position of the deck based on one or more of a body length of the person, an arm length of the person, and grab handle height.

4. The motor vehicle as recited in claim 1, wherein:
the controller is configured to interpret the information from the sensor to determine a speed of the person, and
the controller is configured to instruct the motor such that the position of the deck is adjusted before the person is in a position to enter the motor vehicle.

5. The motor vehicle as recited in claim 1, wherein:
in response to instructions from the controller, the motor is configured to adjust a position of the deck between a stowed position and one of a plurality of predefined deployed positions, and
in each of the predefined deployed positions, the deck is at a different height from a ground surface relative to each of the other deployed positions.

6. The motor vehicle as recited in claim 5, wherein the controller is configured to issue an instruction to the motor to move the deck to a particular one of the plurality of deployed positions based on the information from the determined length.

7. The motor vehicle as recited in claim 1, wherein the controller is configured to instruct the motor to adjust a height position of the deck relative to a ground surface, a lateral position of the deck relative to a body of the motor vehicle, and an angular position of the deck based on the information from the sensor.

8. The motor vehicle as recited in claim 1, wherein:
the position of the deck is adjusted based on one or more factors in addition to the determined length based on a mode selected by a user of the motor vehicle,
in a first mode, the additional factors include curb height and floor height, and
in a second mode, the additional factors include curb height, floor height, and seat height.

9. The motor vehicle as recited in claim 1, wherein, in addition to the determined length, the controller is configured to instruct the motor to adjust the position of the deck based on one or more of a curb height, a floor height, and a seat height.

10. The motor vehicle as recited in claim 1, wherein:
the controller is configured to use the information from the sensor to recognize the person as an authorized user, and
if the authorized user has a predefined deck position setting, the controller is configured to instruct the motor to set the position of the deck to the predefined deck position setting.

11. The motor vehicle as recited in claim 1, wherein:
the controller is configured to interpret the information from the sensor as a plurality of people adjacent the motor vehicle,
the controller is configured to determine an ideal position of the deck for each of the plurality of people based at least on a leg length of each of the plurality of people, and the controller is configured to rank the plurality of people and to instruct the motor to position the deck to the ideal position corresponding to the higher-ranked of the plurality of people.

12. The motor vehicle as recited in claim 1, wherein the controller is configured to interpret the information from the sensor to determine the length of one or both of a femur or a tibia of the person.

13. The motor vehicle as recited in claim 1, wherein:
the controller is configured to remember the position,
the controller is configured to instruct the motor to move the deck from the position to a stowed position to after the person enters the motor vehicle, and
in anticipation of the person exiting the motor vehicle, the controller is configured to instruct the motor to move the deck from the stowed position back to the position.

* * * * *